US007597872B2

(12) United States Patent
Carrette et al.

(10) Patent No.: US 7,597,872 B2
(45) Date of Patent: Oct. 6, 2009

(54) PROCESS FOR TREATING A GAS CONTAINING HYDROGEN SULPHIDE AND SULPHUR DIOXIDE

(75) Inventors: Pierre-Louis Carrette, Lyons (FR); Bruno Delfort, Paris (FR); Sophie Drozdz, Lyons (FR); Ludovic Raynal, Oullins (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 333 days.

(21) Appl. No.: 11/369,821

(22) Filed: Mar. 8, 2006

(65) Prior Publication Data

US 2006/0204433 A1    Sep. 14, 2006

(30) Foreign Application Priority Data

Mar. 9, 2005    (FR) .................................. 05 02367

(51) Int. Cl.
*C01B 17/05*    (2006.01)
(52) U.S. Cl. .................... 423/574.1; 423/575; 502/150; 502/155; 502/162; 502/167; 502/200
(58) Field of Classification Search .............. 423/574.1, 423/575; 502/150, 155, 162, 167, 200
See application file for complete search history.

(56) References Cited

U.S. PATENT DOCUMENTS

| 3,160,601 | A | * | 12/1964 | Hyde ..................... 502/167 |
| 3,516,793 | A |   | 6/1970  | Renault |
| 3,896,215 | A | * | 7/1975  | Bratzler et al. .............. 423/576 |
| 4,456,696 | A | * | 6/1984  | Arbir et al. .................. 502/167 |
| 6,315,961 | B1 |  | 11/2001 | Boucot et al. |
| 6,495,117 | B1 |  | 12/2002 | Lynn |
| 6,627,108 | B1 |  | 9/2003  | Dezael et al. |
| 2001/0055549 | A1 | | 12/2001 | Lecomte et al. |
| 2002/0012617 | A1 | | 1/2002  | Lecomte et al. |

FOREIGN PATENT DOCUMENTS

| FR | 2122674 A5 | 9/1972 |
| FR | 2756197 A1 | 5/1998 |
| FR | 2757147 A1 | 6/1998 |
| FR | 2784370 A1 | 4/2000 |
| FR | 2786111 A1 | 5/2000 |
| WO | WO 90/07467 A1 | 7/1990 |

* cited by examiner

*Primary Examiner*—Timothy C Vanoy
(74) *Attorney, Agent, or Firm*—Millen, White, Zelano, Branigan, P.C.

(57) ABSTRACT

A process for treating a gas containing hydrogen sulphide ($H_2S$) and sulphur dioxide, contacting the gas
  at a suitable temperature with an organic solvent containing at least a soluble catalytic system, comprising at least one compound comprising at least one functional group A consisting of a carboxylic acid function and at least one functional group B comprising at least one nitrogen atom and which can produce an acid-base type reaction with at least one functional group A under the operating conditions of said process;
  and recovering a gaseous effluent substantially depleted in hydrogen sulphide and sulphur dioxide along with liquid sulphur separated from the solvent by liquid-liquid decantation.

20 Claims, No Drawings

PROCESS FOR TREATING A GAS CONTAINING HYDROGEN SULPHIDE AND SULPHUR DIOXIDE

FIELD OF THE INVENTION

The present invention relates to the treatment of gaseous effluent containing hydrogen sulphide and sulphur dioxide.

It concerns a process for treating a gaseous effluents containing hydrogen sulphide and sulphur dioxide using an organic solvent which comprises a catalytic system which can slow by-product formation during said treatment.

It also concerns the catalytic system used in this process.

The process of the invention may, for example, be used to treat effluents from the Claus process. However, it is more generally applicable to any gas containing hydrogen sulphide and sulphur dioxide. It is not necessary for the $H_2S$ and/or $SO_2$ to be admitted in the gaseous form, one of the gases or even both gases possibly being initially present in the dissolved state in the solvent containing the catalytic system of the invention.

The Claus process is widely used, in particular in refineries (downstream of hydrodesulphurization units or catalytic cracking units) and for the treatment of natural gas, to recover elemental sulphur from gaseous feeds containing hydrogen sulphide. However, the effluents emitted by Claus units, even after several catalytic stages, comprise non negligible quantities of acidic gases, principally $H_2S$ and $SO_2$. It is then necessary to treat such effluents from the Claus unit to eliminate the majority of toxic compounds, principally $H_2S$ and $SO_2$, to satisfy antipollution regulations.

PRIOR ART

It is known to recover from a Claus unit about 95% by weight of the sulphur which is present. A treatment of the effluent from the Claus unit using a CLAUSPOL® unit (industrial process trade mark) can generally recover 99.8% by weight of the sulphur from the exothermic Claus reaction:

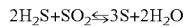

$$2H_2S+SO_2 \leftrightarrows 3S+2H_2O$$

French patent FR-B-1 592 092 describes a treatment for the effluent from the Claus unit using a reaction medium constituted by an organic solvent and at least one catalyst comprising an alkaline or alkaline-earth salt of an organic acid.

Contact of the gas to be treated and the organic solvent containing the catalyst is made in a gas-liquid reactor-contactor provided with contact elements, i.e. bulk or structured type packing, monoliths, column plates, metallic foam or ceramic foam or any other equipment which encourages matter transfer from the gas to the liquid. The temperature in the reactor is controlled by passing solvent through a heat exchanger to encourage the highest possible degree of conversion to sulphur, while avoiding the formation of solid sulphur.

In that type of unit, the solvent with a limited capacity to dissolve elemental sulphur is charged beyond saturation with free liquid elemental sulphur, which can then be separated from the solvent by simple decantation. This liquid sulphur-solvent decantation is carried out in a liquid-liquid decantation zone which may, for example, be placed at the bottom of the reactor-contactor.

The operation of such a unit is described in the following references:

Y Barthel, H Gruhier: "The IFP Clauspol 1500 Process: Eight Years of Industrial Experience", Chem Eng Monogr, 10 (Large Chem Plants), 1979, pp 69-86);

Hennico A, Barthel Y, Benayoun D, Dezael C: Clauspol 300: The New IFP TGT Process" (for presentation at the AlChE Summer National Meeting, Denver (Colo.), Aug. 14-17, 1994).

It is also known that the degree of desulphurization of a unit of that type may be improved by desaturating the solvent in sulphur in a desaturation loop, for example using the process described in the Applicant's patent FR-B-2 753 396. In that case, a portion of the liquid-liquid solution of solvent and sulphur extracted from the end of the reactor-contactor is cooled to crystallize the sulphur.

That crystallized sulphur is then separated from the solvent by various solid-liquid separation means, such as filtration, decantation or centrifuging. A solvent may be obtained which is depleted in sulphur, which may be recycled to the reactor-contactor, and also a suspension may be obtained that is enriched in solid sulphur which may be reheated to fuse the sulphur then sent to a liquid-liquid solvent-sulphur decantation zone from which the liquid sulphur is recovered.

Such a process may, however, be limited in its application. In fact, secondary reactions generally occur in the reactor-contactor, which reactions lead to the formation of by-products, mainly salts such as sulphates or thiosulphates of alkalis or alkaline-earths deriving, for example, from the slow degradation of the catalyst.

Those by-products tend to accumulate on the surface of the contact elements, which renders decantation of the liquid sulphur difficult and increases the pressure drop through the reactor-contactor. For this reason, it may periodically be necessary to stop the unit to eliminate those salts by washing.

It is also known that the solid by-products from a unit of that type may be eliminated, for example using a process described in FR-B-2 784 370. That process comprises the following characteristic steps:

a fraction of solvent comprising solid by-products is removed;

said fraction is sent to a treatment step;

at the end of which at least a stream comprising the majority of the by-products and a stream essentially composed of solvent which is almost free of by-products are recovered.

In FR-B-2 786 111, the step for eliminating by-products is carried out at a temperature which allows the formation and growth of crystals of those by-products.

The processes described in French patents FR-B-2 784 370 and FR-B-2 786 111 can eliminate the by-products without stopping the unit carrying out the process. However, the quantity of by-products formed is unchanged with respect to the treatment described in FR-B-1 592 092.

Since those by-products essentially derive from the slow degradation of the catalyst, the concept behind the present invention is to use another type of catalytic system which can reduce the rate of formation of by-products, and thus reduce the quantity of those by-products formed during a given operational period.

Surprisingly, a catalytic system has been discovered the use of which greatly reduces the formation of by-products.

Since those by-products are generally eliminated by washing with water, either in the reactor-contactor or in an elimination step as described in FR-B-2 784 370 and FR-B-2 786 111, the present invention can thus reduce the frequency of washing, and reduce the quantity of by-products to be treated in water treatment systems associated with the process, which represents large cost savings for the operator.

DETAILED DESCRIPTION OF THE INVENTION

Thus, the invention provides a process for the treatment of a gas containing hydrogen sulphide ($H_2S$) and sulphur dioxide ($SO_2$) in which said gas is brought into contact, at a suitable temperature, in general in the range 20° C. to 160° C., with an organic solvent containing at least one catalytic system which is soluble in said solvent, and a gaseous effluent which is depleted in hydrogen sulphide and sulphur dioxide is recovered along with liquid sulphur separated from the solvent by liquid-liquid decantation, the process being characterized in that the catalytic system comprises at least one compound comprising at least one functional group A consisting of a carboxylic acid function and at least one functional group B comprising at least one nitrogen atom and which can carry out an acid-base type reaction with at least one functional group A under the implementation conditions of said process.

The subject matter of the invention also encompasses the formulation of the catalytic system per se.

The organic solvent used may be selected from many organic solvents which are stable under the operating conditions of the process of the invention. Preferably, the solvent used may be constituted by one or more organic solvents selected from solvents described in FR-A-1 592 092.

Sulpholane, phosphoric esters, alcohols or heavy polyols containing, for example, 12 to 20 carbon atoms, esters of alcohols or polyols, and preferably solvents belonging to the group formed by alkylene glycols, ethers and/or esters of alkylene glycols, polyalkylene glycols, ethers and/or esters of polyalkylene glycols, may be cited in particular.

Examples of solvents belonging to the preferred group which may be cited are triethylene glycol, tetraethylene glycol dimethylether, decaethyleneglycol ethylether, polyethylene glycol with an average molecular weight of 200 g/mole, polyethylene glycol with an average molecular weight of 400 g/mole and dipropylene glycol.

The solvent may contain 0 to 90% by weight of water, preferably 0 to 50% and ideally 0 to 20%. The water may be added to the solvent and/or derive from absorption of any water which may be present in the gas treated in accordance with the invention.

The catalytic system of the invention may comprise at least one compound comprising at least one functional group A and at least one compound comprising at least one functional group B. It may also be constituted by at least one compound comprising the two types of functional groups A and B at the same time.

The compound(s) constituting the catalytic system may also comprise at least one functional group of a type which differs from groups A and B, the essential characteristic remaining that the catalytic system as a whole has at all times to have at least one group A and at least one group B.

As mentioned above, the catalytic system of the invention may comprise at least one compound comprising at least one functional group A and at least one compound comprising at least one functional group B.

In this case, the functional groups A may be carried by compounds preferably selected from the acids or polyacids described in FR-B-1 592 092. Thus, non limiting examples which may be cited are hexanoic acid, adipic acid, tartaric acid, citric acid, cyclohexanecarboxylic acid, benzoic acid, salicylic acid, 3-hydroxybenzoic acid, 2,5-dihydroxybenzoic acid, 3,5-dihydrobenzoic acid, phthalic acid, isophthalic acid, terephthalic acid, 5-hydroxyisophthalic acid and nicotinic acid.

In a variation of the invention, the functional group A may be carried by a compound obtained by partial esterification of a polyacid or an acid anhydride by the solvent of the invention, when said solvent contains at least one alcohol function. This type of compound is described, for example, in FR-B-2 115 721. An example in this category which may be cited is phthalic acid mono-esterified with polyethylene glycol with an average molar mass of 400.

The functional groups B designate all functional groups comprising a nitrogen atom which can carry out an acid-base type reactor with at least one functional group A, under the implementation conditions of the process of the invention.

Non limiting examples of functional groups B are primary, secondary or tertiary amine functions, aromatic amines or saturated or non saturated, aromatic or non aromatic heterocycles comprising at least one nitrogen atom.

Examples of compounds comprising functional groups B are alkanolamines, pyridine, pyrimidine, piperidine, piperazine, morpholine, aniline, benzylamine, phenethylamine, picoline, hydrazine, hydroxylamine, quinoline, isoquinoline, imidazole, 1,2,3-triazole, 1,2,4-triazole, isoxazole, thiazole, benzothiazole, tetrazole, thiadizaole, thiazine, guanidine and derivatives thereof.

Said compounds may, for example, and in a non limiting manner, comprise functional groups selected from hydroxyl, amino, carboxy, alkyl, alkoxy, phenyl, benzyl, hydroxyalkyl, phenol, aminoalkyl, alkylamino, alkylene glycols and polyalkylene glycols. All of these compounds are compatible with the definition of the functional group B.

Preferred compounds comprising at least one functional group B which may be used in the invention which may be cited by way of examples are diethanolamine, 2-methylimidazole, 2-isopropylimidazole and 2-ethyl-4-methylimidazole.

The catalytic system of the invention may also be constituted by at least one compound comprising the two types of functional groups A and B at the same time.

In this case, non-limiting examples of compounds comprising at least one functional group A and at least one functional group B on the same molecule may be selected from anthranilic acid, picolinic acid, citrazinic acid, isocinchomeronic acid, 4-aminobenzoic acid, 3-aminobenzoic acid, 4-(aminomethyl)benzoic acid, 3-(dimethylamino)benzoic acid, 5-aminoisophthalic acid, 2,5-pyridinedicarboxylic acid, 2-phenylglycine, 2,6-pyridinedicarboxylic acid, 2,4,6-pyridinetricarboxylic acid, 2,3-pyrazinedicarboxylic acid, 4-aminophenylacetic acid, N-phenylglycine, tyrosine, N-phenylalanine, 4-(2-aminoethyl)benzoic acid, 2-carboxypyrrole, proline, threonine, glutamic acid, pipercolinic acid, 4-hydroxy-3-(morpholinomethyl)benzoic acid, aspartic acid and derivatives thereof.

Preferred compounds comprising functional groups A and B at the same time on the same molecule which may be cited are 3-aminobenzoic acid and 5-aminoisophthlic acid.

In all cases, the molar ratio of all of the functional groups A to all of the functional groups B of the catalytic system is preferably in the range 0.1 to 100, more preferably 0.5 to 10, and still more preferably in the range 1 to 5.

The concentration of the catalytic system in the solvent is advantageously in the range 0.1% to 20% by weight, and more advantageously in the range 0.5% to 10% by weight.

The temperature at which contact of the gas to be treated with the solvent containing the catalytic system of the invention is made is preferably in the range 115° C. to 160° C.

The process of the invention is particularly well suited to the treatment of gas having an acidic gas content ($H_2S+SO_2$) in the range 0.1% to 100% by volume, more particularly gas having a low acidic gas content ($H_2S+SO_2$), for example in the range 0.1% to 50% by volume, and more particularly still in the range 0.5% to 5% by volume.

It is not necessary for $H_2S$ and/or $SO_2$ to be admitted in the gaseous form; at least one of these gases may be present in the form of a solution which has been produced in one of the solvents of the invention.

Regarding implementation of the process, any conventional technique for contacting a gas with a liquid, i.e. encouraging matter transfer from the gas phase to the liquid phase, may be used. Conventional techniques which may be cited are bulk type or structured type packing or column plates.

In a preferred variation, a technique may be used which employs monoliths or ceramic or metallic foams, inside which the gas-liquid mixture moves. The monolith is defined as an assembly of parallel and identical channels with a typical cross section of the order of a few square millimeters, inside which the gas and liquid move. The advantage of such monoliths and foams is that they allow the flow of the gas-liquid system to be completely defined, and encourage matter transfer between the phases that are present.

EXAMPLES

The three examples below illustrate the advantage of the catalytic system of the invention (Examples 2 and 3) over a prior art catalyst (Example 1).

In the three examples below, the gas to be treated has the following characteristics:

$H_2S$: 2 Nl/h (normal liters/hour);
$SO_2$: 1 Nl/h;
$H_2O$: 30 Nl/h;
$N_2$: 67 Nl/h.

The pressure was atmospheric pressure.

The gas was brought into contact with the solvent at 125° C. in a glass column with a diameter of 3 cm provided with perforated plate type contact elements. The solvent was constituted by 500 milliliters of polyethylene glycol with an average molar mass of 400 g/mole (PEG400) containing the catalytic system.

A chromatographic analysis of the purified gas allowed the conversion yield of sulphur-containing gases ($H_2S$ and $SO_2$) to sulphur to be monitored.

The sulphur formed by the chemical reaction was liquid. It separates from the solvent at the bottom of the column by simple decantation.

In the three examples, the duration of the experiment was 300 hours.

Example 1

In Accordance with Prior Art

The catalytic system was sodium salicylate in a concentration of 100 millimoles/kg.

In this example, degradation of the catalytic system led to the formation of $Na_2SO_4$ which is not very soluble in PEG 400 (solubility 1.2 millimoles/kg at 125° C.).

The salt thus precipitated as it was formed. The quantity of salt formed as a function of time was determined by residual sodium ion content determination in solution in the PEG 400. The technique employed for this content determination was capillary electrophoresis. A linear relationship exists between the quantity of sodium ions lost by precipitation as a function of the quantity of $H_2S$ converted.

In this example, 1.5 millimoles of $Na^+$ were precipitated per mole of converted $H_2S$, i.e. 0.75 millimoles of $Na_2SO_4$ were formed per mole of converted $H_2S$.

Example 2

In Accordance with the Invention

The catalytic system was constituted by 100 millimoles/kg of salicylic acid (compound carrying functional group A) in the presence of 100 millimoles/kg of diethanolamine (compound carrying the functional group B).

In this example, degradation of the catalytic system led to the formation of protonated diethanolamine sulphate. This salt is more soluble in PEG 400 than $Na_2SO_4$ and saturation of the solvent was not reached during the period of the experiment.

Formation of these protonated diethanolamine sulphates was followed by determining the content of sulphate ions in solution in the PEG 400. The technique employed for this content determination was capillary electrophoresis. As for Example 1, a linear relationship exists between the quantity of sodium ions formed as a function of the converted quantity of $H_2S$.

The following result was obtained: 0.088 millimoles of protonated diethanolamine sulphates were formed per mole of converted $H_2S$.

In this example, the formation of sulphate type salts was thus 8.5 times lower than with a prior art catalytic system (Example 1).

Example 3

In Accordance with the Invention

The catalytic system was constituted by 100 millimoles/kg of salicylic acid in the presence of 100 millimoles/kg of 2-methylimidazole.

In this example, degradation of the catalytic system led to the formation of protonated 2-methylimidazole sulphate. This salt is more soluble in PEG 400 than $Na_2SO_4$ and saturation of the solvent was not reached during the period of the experiment. Hence, formation of these protonated 2-methylimidazole sulphates was followed by determining the content of sulphate ions in solution in PEG 400. The technique employed for this content determination was capillary electrophoresis. As for Examples 1 and 2, a linear relationship exists between the quantity of sodium ions formed as a function of the quantity of $H_2S$ converted.

The following result was obtained: 0.096 millimoles of protonated 2-methylimidazole sulphates were formed per mole of converted $H_2S$.

In this example, the formation of sulphate type salts was about 7.8 times lower than with a prior art catalytic system (Example 1).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 05/02.367, filed Mar. 9, 2005 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the treatment of a gas containing hydrogen sulphide ($H_2S$) and sulphur dioxide ($SO_2$), comprising contacting said gas with an organic solvent containing a catalytic system which is soluble in said solvent, and recovering a gaseous effluent which is depleted in hydrogen sulphide and sulphur dioxide along with liquid sulphur separated from the solvent by liquid-liquid decantation, wherein in the process said catalytic system comprises at least one compound comprising at least one functional group A consisting of a carboxylic acid function and at least one compound, which may or may not be distinct, comprising at least one functional group B comprising at least one nitrogen atom and which can carry out an acid-base type reaction with at least one functional group A under the implementation conditions of said process, said catalytic system excluding any alkali metal or alkaline earth metal salts of organic acids.

2. A process according to claim 1, wherein the solvent is alkylene glycols, ethers of alkylene glycols, esters of alkylene glycols, ethers and esters of alkylene glycols, polyalkylene glycols, ethers of polyalkylene glycols, esters of polyalkylene glycols, or ethers and esters of polyalkylene glycols.

3. A process according to claim 1, wherein at least one of the compounds containing the functional group A is obtained by partial esterification of a polyacid or an acid anhydride by said solvent when said solvent contains at least one alcohol function.

4. A process according to claim 1, wherein said catalytic system comprises at least one compound comprising at least one functional group A and at least one compound comprising at least one functional group B.

5. A process according to claim 4, in which the compound carrying at least one functional group A is hexanoic acid, adipic acid, tartaric acid, citric acid, cyclohexanecarboxylic acid, benzoic acid, salicylic acid, 3-hydroxybenzoic acid, 2,5-dihydroxybenzoic acid, 3,5-dihydrobenzoic acid, phthalic acid, isophthalic acid, terephthalic acid, 5-hydroxyisophthalic acid, nicotinic acid or mixture thereof.

6. A process according to claim 1, wherein the compound carrying at least one functional group B is alkanolamines, pyridine, pyrimidine, piperidine, piperazine, morpholine, aniline, benzylamine, phenethylamine, picoline, hydrazine, hydroxylamine, quinoline, isoquinoline, imidazole, 1,2,3-triazole, 1,2,4-triazole, isoxazole, thiazole, benzothiazole, tetrazole, thiadizaole, thiazine, guanidine, or mixtures thereof.

7. A process according to claim 6, wherein the compound carrying at least one functional group B comprises at least one functional group which is hydroxyl, amino, carboxy, alkyl, alkoxy, phenyl, benzyl, hydroxyalkyl, phenol, aminoalkyl, alkylamino, alkylene glycols or polyalkylene glycols.

8. A process according to claim 7, wherein the compound carrying the functional group B is diethanolamine, 2-methylimidazole, 2-isopropylimidazole or 2-ethyl-4-methylimidazole.

9. A process according to claim 1, wherein the compound carrying a functional group A and a functional group B at the same time is anthranilic acid, picolinic acid, citrazinic acid, isocinchomeronic acid, 4-aminobenzoic acid, 3-aminobenzoic acid, 4-(aminomethyl)benzoic acid, 3-(dimethylamino) benzoic acid, 5-aminoisophthalic acid, 2,5-pyridinedicarboxylic acid, 2-phenylglycine, 2,6-pyridinedicarboxylic acid, 2,4,6-pyridinetricarboxylic acid, 2,3-pyrazinedicarboxylic acid, 4-aminophenylacetic acid, N-phenylglycine, tyrosine, N-phenylalanine, 4-(2-aminoethyl)benzoic acid, 2-carboxypyrrole, proline, threonine, glutamic acid, pipecolinic acid, 4-hydroxy-3-(morpholinomethyl)benzoic acid, aspartic acid or mixtures thereof.

10. A process according to claim 9, wherein the compound carrying a functional group A and a functional group B at the same time is 3-aminobenzoic acid or 5-aminoisophthalic acid.

11. A process according to claim 1, wherein the molar ratio of the functional groups A to the functional groups B taken over the whole of the catalytic system is 0.1 to 100.

12. A process according to claim 11, wherein said molar ratio is in the range 0.5 to 10.

13. A process according to claim 11, wherein said molar ratio is in the range 1 to 5.

14. A process according to claim 1, wherein the proportion of the catalytic system in the solvent is in the range 0.1% to 20% by weight.

15. A process according to claim 14, wherein said proportion is 0.5% to 10% by weight.

16. A process according to claim 1, wherein the contact temperature of the gas to be treated with the solvent containing the catalytic system is 20° C. to 160° C.

17. A process according to claim 16, wherein said temperature is 115° C. to 160° C.

18. A process according to claim 1, wherein the gas-liquid mixture is moved inside a monolith or a ceramic or metallic foam.

19. A process according to claim 1, wherein the gas containing hydrogen sulfide and sulfur dioxide is an effluent from a Claus unit.

20. A process for the treatment of a gas containing hydrogen sulphide ($H_2S$) and sulphur dioxide ($SO_2$), comprising contacting said gas with an organic solvent containing a catalytic system which is soluble in said solvent, and recovering a gaseous effluent which is depleted in hydrogen sulphide and sulphur dioxide along with liquid sulphur separated from the solvent by liquid-liquid decantation, wherein in the process said catalytic system consists of at least one compound having at least one functional group A that is a carboxylic acid function and at least one compound, which may or may not be distinct, with at least one functional group B that is at least one nitrogen atom and which can carry out an acid-base type reaction with at least one functional group A under the implementation conditions of said process.

* * * * *

UNITED STATES PATENT AND TRADEMARK OFFICE
CERTIFICATE OF CORRECTION

PATENT NO. : 7,597,872 B2 Page 1 of 1
APPLICATION NO. : 11/369821
DATED : October 6, 2009
INVENTOR(S) : Carrette et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 545 days.

Signed and Sealed this

Twenty-eighth Day of September, 2010

David J. Kappos
*Director of the United States Patent and Trademark Office*